Figure 1:
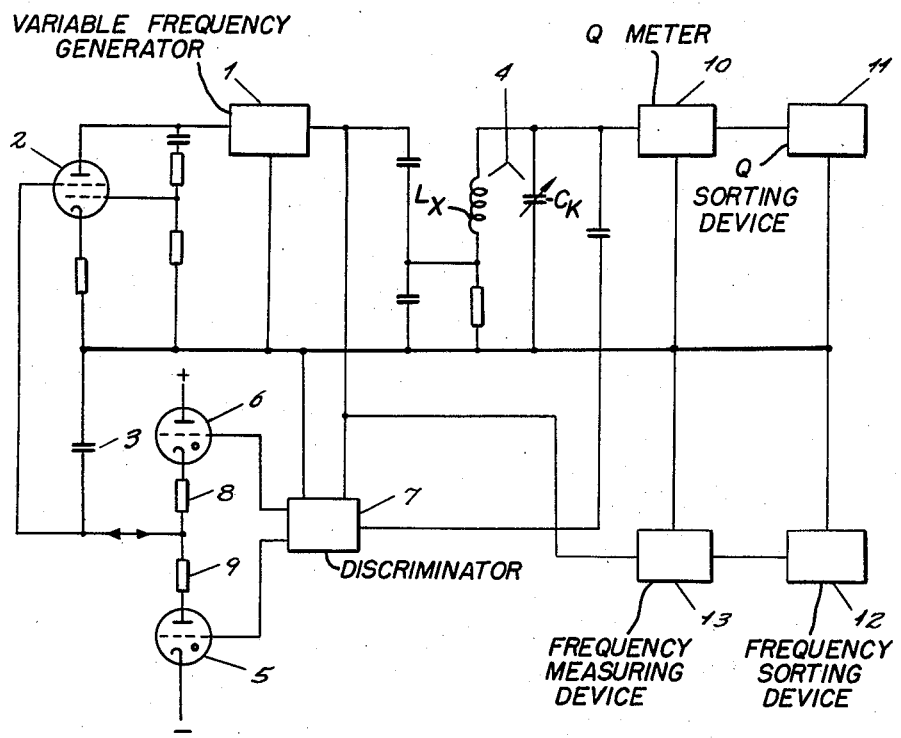

United States Patent Office 2,902,645
Patented Sept. 1, 1959

2,902,645
AUTOMATIC MEASURING DEVICE FOR INDUCTORS

Kürt Wallenfang, Porz (Rhine), Germany, assignor to Steatit-Magnesia Aktiengesellschaft, Lauf (Pegnitz), Germany Application January 24, 1955, Serial No. 483,670

4 Claims. (Cl. 324—59)

My invention relates to an electrical circuit which will automatically measure the Q and inductance of an inductor in a very short period of time.

Hence the use of my novel measuring circuit can be adapted to mass production techniques.

The principle of my invention is to provide a resonant circuit in which the inductor to be measured is a component part and to vary the input frequency of a variable frequency generator supplying a constant voltage to the resonant circuit until resonance is established in the resonant circuit.

The variation of the input frequency is automatically adjusted by a feed-back circuit which is responsive to the difference between the input frequency to the test circuit and the resonant frequency of the test circuit itself by comparison of position of phase of both frequencies. This feed-back then acts to bring the frequency of the variable frequency generator to the resonant frequency of the measuring circuit in a substantially instantaneous time.

Prior art arrangements for the measurement of Q and the inductance of an inductor show a resonant measuring circuit in which the inductor to be measured is a component part.

A variable capacitor is also provided in the measuring circuit and a constant frequency is applied. The variable capacitor is then varied until the measuring circuit comes into resonance with the constant frequency of the constant frequency generator.

Hence a mechanical fine tuning of the capacitor is needed thereby leading to time consuming measurements. In order to shorten this time required for the fine tuning, semi-automatic operation has been obtained by special mechanisms used to drive the capacitor. These special mechanisms are then made to be responsive to the resonant frequency of the test circuit. This arrangement, however, was still time consuming and quite expensive.

In the instant invention, I avoid the above mentioned disadvantages by using a completely electronic system to thereby result in an almost instantaneous sharp tuning of the variable frequency generator in response to the resonant frequency of the test circuit.

It should be noted that my test circuit can be either a series resonant circuit or a parallel resonant circuit. In the case of parallel resonant circuits, I could, if desired, provide a sorting device for the measured inductors which would place them in bins according to their Q measurement or their inductance measurement according to the peak voltage across the test circuit. In the case of series resonant circuits, I can do the same as above in response to the maximum current through the test circuit.

Accordingly, a primary object of my invention is to provide a fully automatic measuring circuit to measure the Q and inductance of inductors by varying the input frequency to a resonant circuit of which the inductor is a component part.

Another object of my invention is to provide an automatic measuring circuit for inductors in which the inductor is a component part of the resonant circuit and the input frequency to the resonant circuit is varied responsive to the difference between the input frequency and the resonant frequency of the test circuit.

Figure 2:
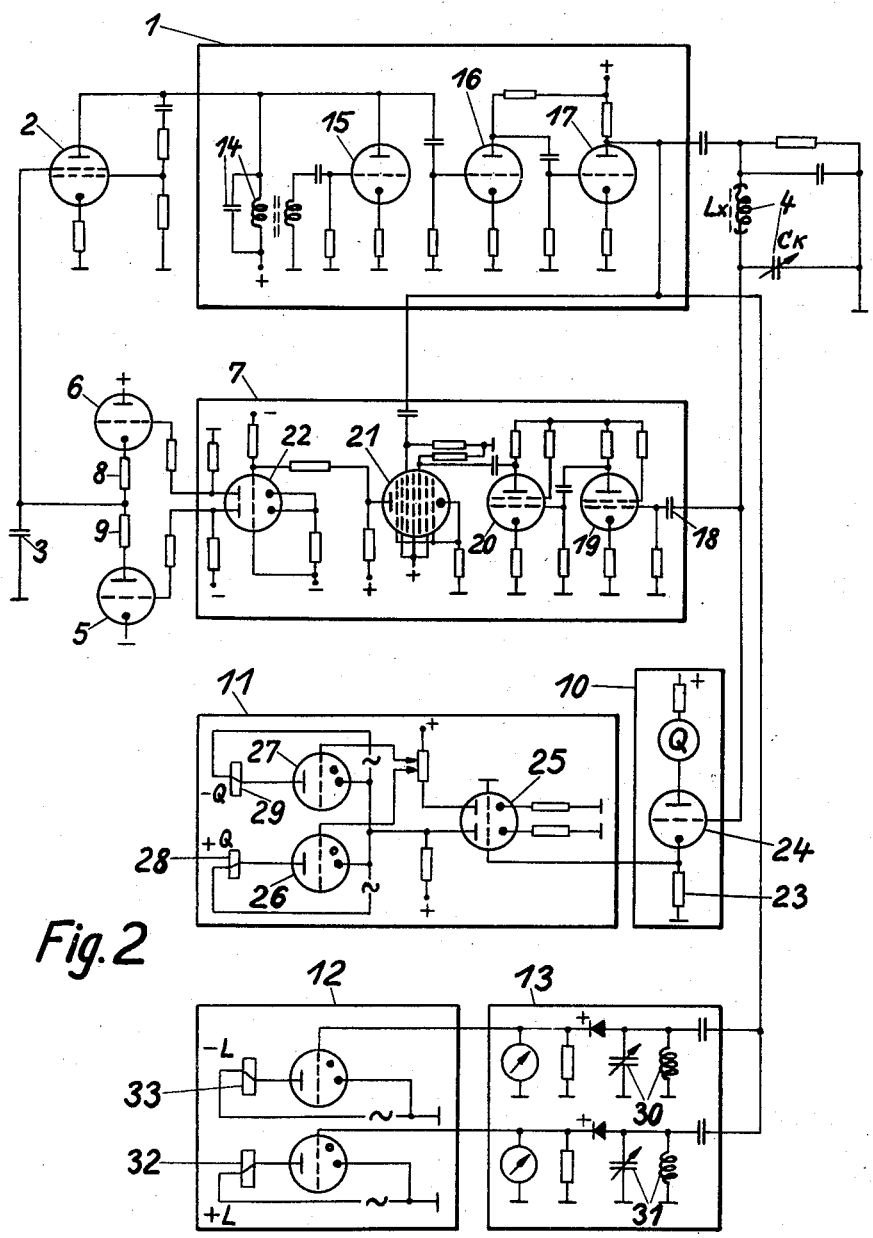

These and other objects of my invention will be apparent from the following description when taken in connection with the accompanying drawings of which Fig. 1 is a schematic circuit diagram of a device embodying the invention; and Fig. 2 is a more detailed schematic circuit diagram of the device shown in Fig. 1.

The device of my invention comprises a variable high frequency generator 1 of Figure 1 which is shown in Fig. 2 as comprising an oscillating circuit 14 and three tubes 15, 16, 17. The high frequency voltage generated in the oscillating circuit 14 is amplified by the three tubes 15, 16, 17 and the amplitude of the output voltage of the generator 1 is held constant by means not shown but well known to those skilled in the art.

The frequency of the variable high frequency generator 1 may be retuned by a tube 2, but the output voltage of the variable high frequency generator 1 remains constant. Tube 2, it should be noted, can affect the variable high frequency generator 1 as either a capacitance or an inductance. In the embodiment of the figures, however, tube 2 is used as an inductance. Grid control of tube 2 is obtained through the voltage of condenser 3.

The output voltage of the variable high frequency generator 1 is applied to a resonant test circuit 4 by means of a capacitive voltage divider as shown in the drawings.

The resonant test circuit 4 consists of the inductance $L_x$ to be measured and a variable condenser $C_K$. The voltage of the resonant test circuit 4 at resonant frequency is a measure for the Q value of the inductance $L_x$, if the losses within the capacities of the resonant test circuit 4 are low. This method is well known to those skilled in the art.

For the purpose of automatically fine tuning the frequency of the variable high frequency generator 1 to the frequency of the resonant test circuit 4 the high frequency voltage of the resonant test circuit 4 is applied to a discriminator 7. This discriminator 7 as more specifically shown in Figure 2 comprises a small condenser 18 by means of which the high frequency voltage of the resonant test circuit is applied to a two stage amplifier which comprises the tubes 19 and 20 and which simultaneously operates as a limiter so that amplitude changes in the ratio of 1:100 are equalized. The frequency of the resonant test circuit 4 and the frequency of the high frequency generator 1 are then test compared in a special multi-grid tube 21 (for example, the Philips Enneode EQ 80). In response to the position of phase of both frequencies the tube 21 generates a direct voltage change on its anode resistance. This direct voltage change is amplified in a double triode 22 and serves then for grid controlling the tubes 5 and 6. When either of tubes 5 or 6 is energized by suitable grid voltages the condenser 3 is charged from a source of voltage (not shown) through resistor 8 or 9, respectively, which charges the bottom of the condenser 3 more positive or more negative, respectively, relative to its original charge which in the case of resonance is negative. Thus, when the tube 6 is energized tube 5 will be cut off and the potential of the condenser 3 becomes more positive than its original charge. When the tube 5 is energized, tube 6 will be cut off and the potential of the condenser 3 becomes more negative than its original charge. Since the condenser 3 is connected to a control grid of the tube 2 the frequency of the variable high frequency generator 1 changes corresponding to the change of the voltage of condenser 3.

It should be noted that the tubes 5 and 6 could be replaced by relays. This, however, would introduce a mechanical means in the measuring system and thereby increase the measuring time.

The time response of the circuit is then governed by resistors 8 and 9 and tubes 6 and 5 and by the capacitance of condenser 3.

It should be noted, that this embodiment uses a parallel resonant circuit for the test circuit 4. However, it could have been a series resonant circuit as well in which the discriminator 7 would then be responsive to the current in the series resonant circuit. Hence, in effect, discriminator 7 energizes either tube 5 or tube 6 in response to the difference in frequency between the resonant circuit frequency and the input frequency.

A voltage measuring device, or so called Q-meter 10 can be placed in a circuit to monitor the voltage across the parallel circuit. The Q-meter 10 is as usual a vacuum tube voltmeter, which is calibrated in Q-degrees. The Q-meter 10 can be connected to a sorting device 11 such that sorting device 11 will be energized depending upon the peak voltage appearing on the voltage measuring device 10 to place the measured inductance $Lx$ into a bin depending upon its measured Q. Hence, as seen in Figure 2, the voltage on the cathode resistor 23 of the tube 24 controls two thyratrons 26 and 27 by means of an amplifier 25 of the sorting device 11. These thyratrons 26 and 27 place the inductor to be measured into a bin depending upon its measured Q by means of relays 28 and 29.

Similarly, a frequency measuring device 13 can be used to energize a second sorting device 12 in which the measured inductance $Lx$ can be sorted according to its inductance. As seen in Figure 2, the frequency of the generator 1 generates voltages dependent on the inductance $Lx$ across the variable oscillating circuits 30 and 31, voltages which, by means of thyratron control relays 32 and 33, effect sorting of inductors according to their measured inductance. Device 13 responds to variations of the frequency impressed upon it by the input lead into its right side (Figure 2). When the automatic tuning process at generator 1, as described, is completed, its frequency generally is different than it was set for the previous test inductor $Lx$. The new frequency which generator 1 assumes is to be substantially equal to that of the parallel resonant test circuit formed by the inserted inductor $Lx$ and the present condenser $Ck$ (at 4). It is this new frequency of generator 1 that is transmitted to device 13, as herein set forth.

Device 13 includes two adjustable oscillatory circuits 30 and 31, with adjustable capacitors manually preset. The frequencies of circuits 30 and 31 are preset in accordance with the desired tolerance interval for sorting the inductors $Lx$ in accordance with their permeabilities, producing the upper and lower inductance limits for the sorting, as indicated at $+L$ and $-L$ in unit 12. Towards this end, the frequency of one of the two oscillatory circuits (30, 31) is set a little above the standard frequency; and that of the other, a little below it. By standard frequency is meant that frequency which the test oscillatory circuit 4 has when inductor $Lx$ is at the standard or acceptable value for the preset run, i.e., at the median of the tolerance interval $+L$ to $-L$.

If a tested inductor ($Lx$) is acceptable, then the frequency signal from generator 1 (which is adjusted to that of circuit 4 resonance as hereinabove set forth) impressed upon device 13 lies between the preset frequencies of oscillatory circuits 30, 31. At such standard frequency input to device 13 no control action is initiated thereby sufficient to actuate unit 12. However, if the inductance of the test inductor $Lx$ at 4 is outside of or at the borderline of the tolerance interval $+L$, $-L$, then the signal frequency impressed upon device 13 is close to or equal to one of the two preset circuits 30, 31. When the signal input to device 13 is at or near that preset at 30 a voltage is passed on through its associated rectifier; and is impressed upon the control grid of the thyratron control tube associated with the $-L$ relay 33. When relay 33 is thus actuated it is arranged to effect the opening of the corresponding chute in the sorting apparatus. Correspondingly, the signal frequency is at or close to that preset at 31, the $+L$ relay is actuated, for the sorting action. The operation of the circuit taken in conjunction with Figure 1 is as follows:

The constant voltage variable high frequency generator 1 supplies a given frequency to the parallel resonant circuit 4. The instantaneous frequency of the variable high frequency generator 1 and the resonant frequency of parallel resonant circuit 4 are test compared in discriminator 7. The difference between them appears sharply in the position of phase of the two frequencies. This frequency difference is converted in the discriminator 7 into a direct voltage. The direct voltage output of discriminator 7 energizes either tube 5 or tube 6, whereby the bottom of condenser 3 is charged to a more or less negative potential, if the operating point of tube 2 lies in the negative range of characteristic curve.

This potential is then applied to the grid of tube 2 to thereby effect fine tuning of the frequency of variable frequency generator 1. With this change made in the frequency of generator 1, discriminator 7 again compares the difference between the instantaneous frequency of generator 1 and the resonant frequency of resonant circuit 4, and this result is again used to effect further fine tuning of generator 1.

This process continues until the frequency of generator 1 exactly matches the frequency of resonant circuit 4. With this condition, discriminator 7 does not energize either tube 5 or tube 6, both tubes 5 and 6 are cut-off, and the potential of condenser 3 and the generator frequency remain constant. The resonant frequency is thereby stabilized since further tuning does not take place.

It should be noted that this fine tuning takes place at a speed which corresponds to the time constant of the condenser 3 and the resistors 8 and 9 of tubes 6 and 5 respectively. This time constant can be made to be only a few tenths of a second which can be considered a substantially instantaneous time in measuring circuits of this type.

I claim:

1. In an automatic measuring circuit for inductors; a test circuit which upon receiving an inductor to be measured becomes a resonant test circuit and having an input circuit and an output circuit; a discriminator circuit having a first and second input circuit and an output circuit; a variable frequency generator having an input circuit and an output circuit; and a control means including a reactance tube for controlling the output frequency of said resonant test circuit; said control means having an input circuit and an output circuit; said output circuit of said variable frequency generator being connected to said input circuit of said resonant test circuit and to said first input circuit of said discriminator circuit; said output circuit of said resonant test circuit being connected to said second input circuit of said discriminator circuit; said output circuit of said discriminator circuit beng connected to said input circuit of said control means; said output circuit of said control means being connected to said input circuit of said variable frequency generator for controlling the output frequency of said variable frequency generator; said discriminator circuit varying the reactance of said reactance tube of said control means in a direction to change the output frequency of said variable frequency generator until said output frequency is substantially equal to the resonant frequency of said resonant circuit as determined by said inductor.

2. In an automatic measuring circuit for inductors; a test circuit which upon receiving an inductor to be measured becomes a resonant test circuit and having an input circuit and an output circuit; a discriminator circuit having a first and second input circuit and an output circuit; a variable frequency generator having an input circuit and an output circuit; and a control means including a reactance tube for controlling the output frequency of said resonant test circuit; said control means having an input circuit and an output circuit; said output circuit of said variable frequency generator being connected to said input circuit of said resonant test circuit and to said first input circuit of said discriminator circuit; said output circuit of said resonant test circuit being connected to said second input circuit of said discriminator circuit; said output circuit of said discriminator circuit being connected to said input circuit of said control means; said output circuit of said control means being connected to said input circuit of said variable frequency generator for controlling the output frequency of said variable frequency generator; said discriminator circuit varying the reactance of said reactance tube of said control means in a direction to change the output frequency of said variable frequency generator until said output frequency is substantially equal to the resonant frequency of said resonant circuit as determined by said inductor; the output voltage of said variable frequency generator being substantially constant throughout its operating range.

3. In an automatic measuring circuit for inductors; a test circuit which upon receiving an inductor to be measured becomes a resonant test circuit and having an input circuit and an output circuit; a discriminator circuit having a first and second input circuit and an output circuit; a variable frequency generator having an input circuit and an output circuit; and a control means including a reactance tube for controlling the output frequency of said resonant test circuit; said control means having an input circuit and an output circuit; said output circuit of said variable frequency generator being connected to said input circuit of said resonant test circuit and to said first input circuit of said discriminator circuit; said output circuit of said resonant test circuit being connected to said second input circuit of said discriminator circuit; said output circuit of said discriminator circuit being connected to said input circuit of said control means; said output circuit of said control means being connected to said input circuit of said variable frequency generator for controlling the output frequency of said variable frequency generator; said control means further including a first and second control element and a capacitor; said capacitor being connected to a control electrode of said reactance tube; said first and second control elements being connected to said capacitor to vary the charge of said capacitor responsive to the output of said discriminator circuit to control said reactance tube; said first control element being operative only when the output of said discriminator circuit is above a predetermined value; said second control element being operative only when the output of said discriminator circuit is below said predetermined value; said predetermined value being the point at which the output frequency of said resonant test circuit is equal to the output frequency of said variable frequency generator.

4. In an automatic measuring circuit for inductors; a test circuit which upon receiving an inductor to be measured becomes a resonant test circuit and having an input circuit and an output circuit; a discriminator circuit having a first and second input circuit and an output circuit; a variable frequency generator having an input circuit and an output circuit; and a control means for controlling the output frequency of said resonant test circuit; said control means having an input circuit and an output circuit; said output circuit of said variable frequency generator being connected to said input circuit of said resonant test circuit and to said first input circuit of said discriminator circuit; said output circuit of said resonant test circuit being connected to said second input circuit of said discriminator circuit; said output circuit of said discriminator circuit being connected to said input circuit of said control means; said output circuit of said control means being connected to said input circuit of said variable frequency generator for controlling the output frequency of said variable frequency generator; said discriminator circuit driving said control means in a direction to change the output frequency of said variable frequency generator until said output frequency is substantially equal to the resonant frequency of said resonant circuit as determined by said inductor.

References Cited in the file of this patent

UNITED STATES PATENTS

| 2,436,307 | Kinn et al. | Feb. 17, 1948 |
| 2,468,843 | Sunstein | May 3, 1949 |
| 2,566,767 | Hunt | Sept. 4, 1951 |

FOREIGN PATENTS

| 302,725 | Great Britain | Oct. 24, 1929 |